UNITED STATES PATENT OFFICE.

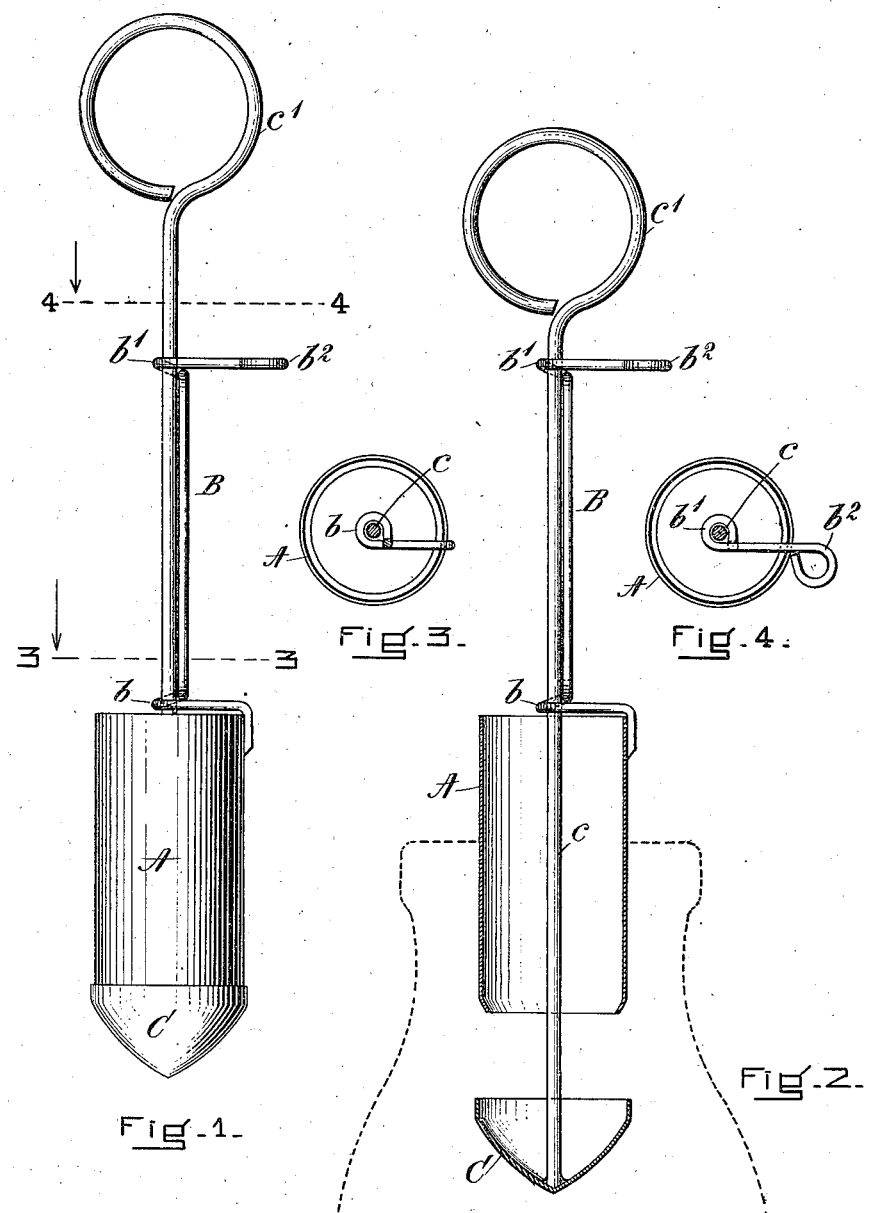

LOTT MANSFIELD, OF HINGHAM, MASSACHUSETTS, ASSIGNOR, BY MESNE ASSIGNMENTS, OF ONE-HALF TO KATE L. MANSFIELD, OF HINGHAM, MASSACHUSETTS, AND ONE-HALF TO WINTHROP N. TROWBRIDGE, OF BROOKLINE, MASSACHUSETTS.

CREAM-DIPPER.

1,013,503. Specification of Letters Patent. Patented Jan. 2, 1912.

Application filed November 3, 1910. Serial No. 590,437.

*To all whom it may concern:*

Be it known that I, LOTT MANSFIELD, of Hingham, in the county of Plymouth and State of Massachusetts, a citizen of the United States, have invented a new and useful Improvement in Cream-Dippers, of which the following is a specification.

Milk at the present time is usually sold in bottles and my invention relates to a dipper adapted to skim the cream from the surface of the milk before the milk has been decanted. For this purpose my dipper is provided with a conical bottom which is separable downward from the cylindrical body of the dipper so that when the dipper is lowered into the bottle the point at the bottom of the dipper will enter the cream first and push it aside so that it will not be mixed with the milk to any appreciable extent. The bottom of the dipper, being separable from the body or cylindrical portion of the dipper, will displace a comparatively small portion of the contents of the bottle, allowing the cream to flow freely up into the cylinder against which the bottom is adapted to close. The bottom may then be closed against the cylinder and the full dipper lifted from the bottle. The means whereby the bottom of the dipper is supported and operated are such as to leave the interior of the cylinder free from surfaces adapted to collect the cream and hence become foul unless extra care is taken in cleaning them, and at the same time the bottom can be closed tight against the bottom of the cylinder so that there is no danger of leakage in transferring the cream from the bottle to a cup or other receptacle. My dipper thus differs from that class which is provided with a bottom partially closed with a strainer which is also difficult to clean or with a hinged bottom where the hinge itself easily becomes foul, or from a dipper having a flat or concave bottom which would usually disturb the layer of cream on being introduced into the bottle.

My invention comprises a dipper made in two parts, one cylindrical and having a smooth interior, and the other forming a bottom therefor and having an entering surface in distinction from a flat or concave surface, the bottom having a rod or stem by which it is manipulated and the cylindrical portion having means attached to the outside thereof whereby the stem may be centered, the cylindrical portion and bottom being separable.

My invention will be understood by reference to the drawings in which it is illustrated in its preferred form.

Figure 1 is a side elevation of my dipper with its bottom or valve closed against the cylinder or cream inclosing portion. Fig. 2 is a vertical section showing the dipper in its open position, and Fig. 3 is a section on line 3—3 of Fig. 1, showing the cylindrical portion in plan. Fig. 4 is a section on line 4—4 of Fig. 1.

I have termed the inclosing or main portion of my dipper the cylindrical portion or cylinder although it is evident that it may be of any other shape. The cylindrical form, however, appears to be the best as it corresponds with the shape of the bottle neck.

$A$ is the cylindrical portion or cylinder preferably made of sheet metal, aluminium or the like, to the outside of which is attached a handle $B$ made of wire. The lower end of this handle $B$ may be soldered or otherwise attached to the outside of the cylinder $A$ and preferably is bent toward the axial line of the cylinder and there given a turn as at $b$ to form a guide for the rod $c$. The upper end of the handle continues vertically in approximately the axial line of the cylinder and may be given another turn as at $b^1$ to form a second guide for the rod $c$. It terminates in a handle $b^2$.

$C$ is the bottom of the dipper formed to fit the lower edge of the cylinder $A$ and make therewith a substantially liquid tight closure. The said bottom is cup shaped and preferably pointed on its under surface so as to form an entering surface to open a passage for the said bottom through the cream by pushing the cream sidewise rather than downward as would be the case were the bottom flat. From the center of this bottom projects upwardly the spindle $c$ through the guides $b$, $b^1$ in the handle $B$ and terminates in a ring $c^1$ by means of which and the handle $B$ the bottom of the dipper may be manipulated.

In operating my device the dipper is first opened into the position shown in Fig. 2 and then is lowered by means of the handle $B$ into the neck of the bottle or milk receptacle to the proper depth so that the cream flows in at the bottom, filling both the bottom and the cylinder as the dipper sinks, the dipper tending to push the cream laterally as it passes through it. When the dipper has been lowered to a proper point the valve C is closed against the bottom of the cylinder by lifting the bottom C by means of the spindle c, thus forming a creamtight receptacle which may be lifted out from the milk bottle by the ring $c^1$ and emptied and thereafter used again as many times as is desirable.

It will be noted that the amount of cream displaced by this device when sunk in the cream is the minimum, so little in fact that there will be but slight tendency of the cream to overflow out of the neck of the bottle when the dipper is first used therein. It will also be noted that in emptying the dipper it is only necessary to open the valve C so that the cream, with the exception of a small portion which has collected in the bottom, will be emptied in the same way that it is taken in, viz: through the bottom. By making the device in this form the cylinder is held firmly by means of the handle B and no mechanism is necessary on the interior of the cylinder.

The above is the simplest form of the invention now known to me, but it may undoubtedly be embodied in other forms, its peculiar characteristic being that the bottom moves downwardly when it is desired to fill or empty the dipper, being preferably separable therefrom, means being provided to operate the bottom as described, and also that the cylinder itself, being smooth on its interior, can be readily cleansed having no hinges or ledges where cream may be collected and decompose.

What I claim as my invention is:—

1. The herein described cream dipper comprising a cylindrical body portion open at its top and bottom and so that the contents thereof may be freely poured from the top thereof, said cylindrical body portion having an entirely unobstructed interior, so that it may be readily cleansed, a removable tapering or conical cupped bottom part tightly fitting the lower end of said cylindrical body portion but being separable therefrom, thus forming a valve which may be opened and closed, an operating rod to which said bottom part or valve is attached and which passes upward through said cylindrical body portion, and a rod-guiding device and handle mounted on said cylindrical body portion but being outside thereof, and serving to centrally hold said rod in the chamber of said body portion, and to serve as a handle for the dipper.

2. The herein described cream dipper comprising a cylindrical body portion open at its top and bottom and so that the contents thereof may be freely poured from the top thereof, said cylindrical body portion having an entirely unobstructed interior, so that it may be readily cleansed, a removable tapering or conical cupped bottom part tightly fitting the lower end of said cylindrical body portion but being separable therefrom, thus forming a valve which may be opened and closed, an operating rod to which said bottom part or valve is attached and which passes upward through said cylindrical body portion, and a rod-guiding device and handle mounted on said cylindrical body portion but being outside thereof, and serving to centrally hold said rod in the chamber of said body portion, and to serve as a handle for the dipper, said rod-guiding and centralizing device and handle consisting of the part B attached to said cylindrical body portion and having the eyes or parts $b$ and $b'$, through which the said rod freely passes, and the laterally extending handle part $b^2$.

LOTT MANSFIELD.

Witnesses:
  ROBERT W. RIELHE,
  ARTHUR K. BLIZARD.